United States Patent [19]
Foust et al.

[11] Patent Number: 5,821,682
[45] Date of Patent: Oct. 13, 1998

[54] METHOD FOR INCORPORATING ANTI-OXIDANTS WITHIN A FLUORESCENT LAMP'S BASE SHELL

[75] Inventors: Donald Franklin Foust, Scotia, N.Y.; William Wayne Akins, Aurora; Vito Joseph Arsena, Highland Heights, both of Ohio; Dennis James Doliac, Wickliffe, Ohio; Deborah Ann Haitko, Schenectady, N.Y.; Jon Bennett Jansma, Pepper Pike, Ohio

[73] Assignee: General Electric Company, Schenectady, N.Y.

[21] Appl. No.: 792,343

[22] Filed: Jan. 31, 1997

[51] Int. Cl.$^6$ ........................................... H01J 5/48
[52] U.S. Cl. .................. 313/318.08; 313/565; 445/2; 445/61; 445/73; 106/657; 106/31.05
[58] Field of Search ................................ 313/565, 318.08, 313/485, 490, 318.01; 445/2, 61, 73; 252/181.3; 106/31.05, 638, 657

[56] References Cited

U.S. PATENT DOCUMENTS

| 5,229,686 | 7/1993 | Fowler et al. | 313/565 |
| 5,229,687 | 7/1993 | Fowler et al. | 313/565 |

*Primary Examiner*—Nimeshkumar Patel
*Attorney, Agent, or Firm*—James Magee, Jr.; Douglas E. Stoner

[57] ABSTRACT

The formation of leachable mercury upon disposal or during TCLP testing of mercury vapor discharge lamps is substantially prevented by incorporation of an organic or inorganic metal mercury antioxidant in the lamp structure or in the test solution.

10 Claims, 2 Drawing Sheets

METHOD FOR INCORPORATING ANTI-OXIDANTS WITHIN A FLUORESCENT LAMP'S BASE SHELL

This invention is directed to mercury vapor arc discharge lamps in which the arc discharge takes place in mercury vapor, including conventional phosphor fluorescent lamps and more particularly to compositions of matter which include agents which prevent the formation of leachable mercury in disposal and testing procedures. The lamps provided herein are characterized by reduced solubilization and leaching of mercury when the lamp is pulverized for testing or upon disposal.

BACKGROUND OF THE INVENTION

Low pressure mercury arc discharge lamps are standard lighting means which include electrodes sealed in a glass envelope, the interior of which may be coated with a phosphor. The lamp also contains a small amount of mercury and an inert gas at low pressure, of about 1 to 5 torr. The term lamp, as used herein, means the complete unit including the glass envelope and the end pieces and plugs for mounting in a lamp fixture, and wires which connect the internal components of the envelope with the end pieces.

During manufacture of fluorescent or low pressure mercury arc lamps a small amount of elemental mercury ($Hg^0$) is sealed in the lamp envelope. Most of the mercury adheres to the phosphor coating while a small quantity is in the vapor phase.

During operation, alkali metal carbonates from the electrodes decompose and form free oxygen in the lamp. The oxygen can react with a portion of the mercury to form soluble mercury oxide (HgO). Soluble mercury oxide is leachable from landfills and other disposal facilities. Soluble mercury oxides or other oxidized forms of mercury generated or produced in the course of the test are detrimental to the accuracy and the reliability of the standard test for determination of the leachability of toxic materials from lamp waste. This test is generally referred to as the Toxicity Characteristic Leaching Procedure or TCLP test.

There is concern about the environmental impact of soluble mercury compounds which can leach into ground water sources, rivers, streams, and the like.

SUMMARY OF THE INVENTION

Ferric and cuprous ions form soluble compounds have been found to capable of oxidizing elemental mercury to the monovalent, mercurous, form which is soluble in an acidic aqueous environment and therefore leachable. The formation of ferric and cuprous compounds depend on exposure to and reaction with oxygen. Ascorbic acid, sodium ascorbate, and sodium gluconate, hereafter called mercury antioxidants, have been shown to alter the oxidation/reduction potentials of the ferric and cuprous ions so that their oxidizing power is reduced. Such compounds incorporated in the lamp structure greatly reduce or prevent the formation of leachable mercurous and mercuric compounds resulting from oxidation of elemental mercury. The term mercury antioxidant as used herein refers to a material which functions to prevent or reduce the formation soluble mercury oxides from elemental or liquid mercury in the presence of ferric and cuprous ions, moisture, and oxygen. The term antioxidant composition refers to the antioxidant compound in admixture with a basing cement or an adhesive binder suitable for application to the metal base of a lamp.

The mercury antioxidant compound can be effectively incorporated into the lamp structure by admixing it with an adhesive binder material such as polyvinylmethacrylate and a liquid processing aid such as denatured alcohol and applying the resulting composition to the aluminum end cap. The alcohol will evaporate and the composition will cure when the basing cement is cured.

The invention provides a mercury vapor discharge lamp comprising an envelope of light transmitting glass which contains, an inert gas and an amount of elemental mercury, a pair of electrodes for establishing an arc discharge, and an effective amount of a mercury antioxidant selected from the group consisting of ascorbic acid, sodium ascorbate, and sodium gluconate. The mercury antioxidant additive is formulated into a thermally curable adhesive composition which is soluble in acidic aqueous solutions. Such compositions generally include an inert filler material, a binder, and a processing solvent. These ingredients are similar to the usual components of basing cements used to secure the glass envelope to the aluminum base or end cap.

Typical fillers include marble flour (calcium oxide). The binder material can be shellac, rosin synthetic resins such as phenolic resin. Processing solvents are generally lower alcohols such as ethyl, propyl, butyl, or amyl alcohol.

The lamp further comprises at least one base or end cap, generally of aluminum metal, having a pair of pins to receive electrode wire from the lamp interior. The base defines a cavity having an inner surface, which is secured to the lamp envelope by a basing cement, the mercury antioxidant being disposed within the cavity. Generally such lamps have a pair of end caps.

In a preferred embodiment of the invention, the mercury vapor discharge lamp is provided with the mercury antioxidant carried on the inner surface of the cavity by means of an inert water soluble adhesive binder rather than as a component of the basing cement.

DESCRIPTION OF THE INVENTION

Figure 1:
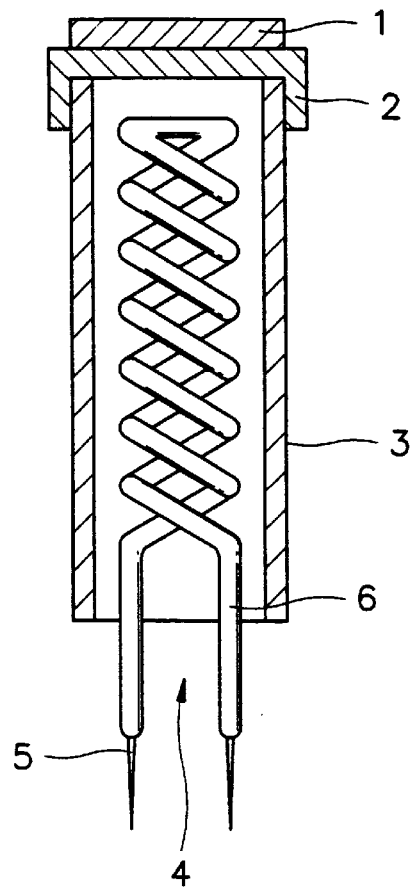
FIG. 1 is a sectional view of a lamp base for a tubular mercury arc lamp having a mercury antioxidant composition in place.
Figure 2:
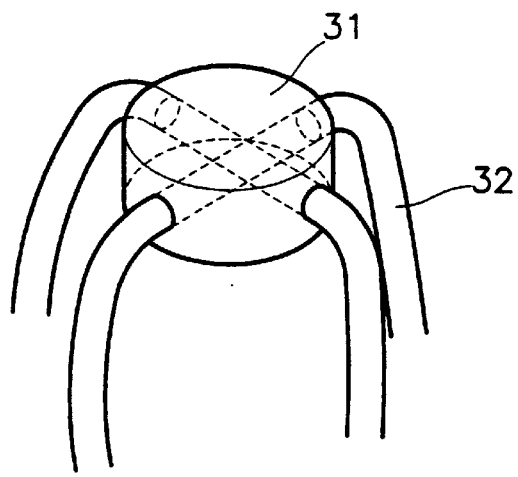
FIG. 2 is a plan view looking into the lamp base from above.

The incorporation of mercury antioxidants in a lamp structure or in the TCLP test solution prevents oxidation or reduces the oxidation potentials of iron and copper from metal components to a form which is soluble but not capable of oxidizing elemental mercury to a soluble form of mercury oxide. Accordingly, the formation of leachable mercury compounds is reduced or prevented.

The formation of leachable mercury when fluorescent lamps are broken and exposed to landfill conditions can be prevented or minimized by preventing oxidation of certain components of the lamp. Certain metal components of fluorescent lamps particularly iron-containing lead wires, copper coated leads, and any brass components generate ferric ($Fe^{+3}$) and cuprous ($Cu^{+1}$) ions when exposed to moisture, oxygen, and acidity.

In order to address the growing concern that excessive amounts of mercury from disposal of fluorescent lamps might leach into surface and subsurface bodies of water, the Environmental Protection Agency has established a maximum concentration level for mercury at 0.2 milligrams of leachable mercury per liter. This is generally determined by the standard analysis known as the Toxicity Characteristic Leaching Procedure (TCLP), a well known test procedure.

In carrying of the TCLP test, the lamps are pulverized to form lamp waste material similar to that which would result from lamp disposal in landfills or other disposal locations. The ambient conditions in such locations may be such as to promote formation of leachable mercury just as the TCLP test conditions themselves tend to allow for formation of leachable mercury in amounts greater than the established limit of 0.2 milligrams per liter.

It has been found that elemental mercury added to mercury-free pulverized lamp materials prepared for the TCLP test is converted to leachable mercury in the course of the test. If elemental mercury alone or in combination with various glass, phosphor, or non-metal lamp components is tested, little or essentially no leachable mercury is found. When elemental mercury is tested in combination with metal lamp components such as copper or iron, lead wires, pins, or other metal hardware, the mercury is transformed into a leachable form.

It was determined by controlled experimentation that both soluble iron and copper are generated under the TCLP test conditions when carried out in the presence of oxygen and that these ionic species are able to oxidized elemental mercury to soluble mercury compounds which are measured as leachable mercury.

Corrosion or dissolution of metals from the metallic state requires the presence of both oxygen and a solvent such as water conditions that exist in the TCLP test and landfill situations.

Mercury antioxidants incorporated into fluorescent lamps during manufacture become operative in the course of preparing lamps for the TCLP test or upon destruction of the lamp during disposal. The presence of such antioxidants will make the TCLP test more accurate and reliable and will reduce the formation of soluble mercury compounds when the lamps are disposed of.

Preferred mercury anti-oxidents are ascorbic acid, sodium ascorbate, and sodium gluconate.

All TCLP test data was obtained by the test procedure prescribed on pages 26987-26998 volume 55, number 126 of the Jun. 29, 1990 issue of the Federal Register.

Briefly, lamps being tested are pulverized into particulate form having the prescribed particle size which is capable of passing through 3/8 inch sieve. The test material is then extracted with a sodium acetate-acetic acid buffer at a pH of about 4.93.

To prevent the spurious formation of leachable mercury upon disposal of mercury vapor discharge lamps and to improve the reliability of the TCLP test an effective amount of mercury antioxidant is incorporated in the lamp structure, for example within the glass envelope exterior to the plasma discharge or in an end-cap, or in the base of the lamp. An effective amount of the mercury antioxidant is that amount which will substantially prevent formation of ferric and cupric compounds which can oxidize elemental mercury to a soluble form. In general, an effective amount of the mercury antioxidant will be enough for the TCLP test results to show the presence of less than about 0.2 parts per million of leachable mercury.

The formation of soluble mercury compounds is illustrated by the data in Table 1, below. Carrying out the TCLP test in the presence of air generates about 1 part per million of copper and about 0.3 parts per million of soluble iron. The amount of soluble mercury formed under these conditions exceeds the regulatory limit of 0.2 parts per million. Increasing the exposure to oxygen increases the amount of soluble copper and soluble mercury formed.

Decreasing exposure to oxygen decreases the formation of soluble copper and soluble mercury.

TABLE 1

| Gas Type | Soluble Cu ppm | Soluble Hg ppm |
| --- | --- | --- |
| Air | 1.07 | 0.777 |
| Argon | 0.06 | <0.050 |
| Oxygen | 3.04 | 1.030 |

When the amount of oxygen is varied by increasing the volume of the head space in the TCLP test jar, the effect of both soluble iron and copper on the formation of soluble mercury is evident from the data in Table 2, below. As the head space volume increases, the amount of soluble mercury increases in response to the formation of increasing amounts of soluble copper and iron.

TABLE 2

| Head Space (mL) | Soluble Mercury (ppb) | Soluble Iron (ppm) | Soluble Copper (ppm) |
| --- | --- | --- | --- |
| 0 | 0 | 210 | 3.62 | 0.35 |
| 1 | 140 | 214 | 4.63 | 0.40 |
| 2 | 205 | 203 | 5.04 | 0.63 |
| 3 | 360 | 250 | 5.22 | 0.43 |
| 4 | 494 | 311 | 5.22 | 0.51 |
| 5 | 763 | 525 | 6.13 | 1.04 |
| 6 | 1013 | 458 | 5.80 | 1.02 |
| 7 | 1508 | 583 | 8.12 | 1.13 |

When a mercury antioxidant is added to the test solution, the formation of soluble mercury is decreased as shown in Table 3, below.

TABLE 3

| Amount of Ascorbic Acid in (gms)/Lamp | Leachable Hg (ppb) per lamp |
| --- | --- |
| 0 | 586 |
| 0.05 | 404 |
| 0.1 | 134 |
| 0.2 | 72 |
| 0.5 | 52 |
| 1.0 | 84 |
| 2.0 | 53 |

The mercury antioxidant can be incorporated in the lamp by encapsulation of the material in a glass capsule that can be placed either in the base of the lamp between the aluminum cap and flare of leaded glass, or placed within the positive column of the lamp. Since the mercury antioxidant is enclosed in a glass capsule it can be present in the inside or positive column of the lamp without affecting lamp function.

The mercury antioxidant can also be incorporated in the basing cement of the lamp that holds the aluminum cap to the leaded glass portion of the end of the lamp. The basing cement generally comprises about 80 weight % marble flour (limestone-CaO), and the balance shellac a phenolic resin binder, a solvent for blending, and a dye used to color the cement. The cement is dispensed through a feeder into the base and heated to cure once assembled with the lamp parts. Curing drives off the solvent and solidifies the cement. The mercury antioxidant is blended with the cement components and incorporated into a lamp manually or by automated manufacturing equipment. The mercury antioxidant is released only when the lamp is destroyed or crushed in preparation for TCLP testing. In this method the antioxidant material is always exterior to the positive column of the lamp.

However, incorporating the antioxidant in the cement may compromise the adherent properties of the cement and result in separation between envelope and base during use.

Another method for incorporating the active mercury antioxidant material in the lamp structure is to admix it with an inert water soluble adhesive carrier or binder. Gums and gelatins have been used as such adhesives and binders. The nature of the gums and gelatins is that they adhere to surfaces when heated. The composition containing the mercury antioxidant can be placed on the inner surface of the aluminum end cap as a ring or discrete button. When the lamp is crushed and exposed to an aqueous environment or placed in the TCLP solution, the water soluble binder allows the mercury antioxidant to be released quickly.

The preferred method of incorporating the antioxidant into the lamp is to form a composition comprising the antioxidant and some of the adhesive components of the basing cement. This admixture is dispensed into the base the aluminum base and the basing cement dispensed on top of it. The antioxidant composition is located between the metal base and the cement and does not affect the torsional properties of the cement. The combined layers are then cured in the usual manner.

Suitable compositions for incorporation of the mercury antioxidant compositions comprises about 5 to 15 weight percent shellac, 3 to 15 weight percent rosin, and 5 to 20 weight percent denatured alcohol or up to about 10 weight percent tertiary amyl alcohol.

A preferred compositions comprises about 50 to 90 weight percent ascorbic acid, 5 to 15 weight percent shellac, 3 to 15 weight percent rosin, and 5 to 20 weight percent denatured alcohol.

An illustrative mercury antioxidant composition comprises about 67.8 weight percent ascorbic acid, 20.3 weight percent varnish, 3.4 weight percent of a thermoplastic resin having a softening point of about 102° C. such as the material available under the tradename Poly-pale. The amount of mercury antioxidant in the composition is chosen to provide about one gram per lamp.

Mercury antioxidants are incorporated into the lamps or test solutions in an effective amount. An effective amount is that amount which will result in less than 200 parts per billion (0.2 ppm) of leachable mercury. The effective amount of any mercury antioxidant for any amount of mercury per lamp can easily be determined from routine dose response data. About 0.2 to about 3 grams, and preferably about 2 grams, of mercury antioxidant per lamp is generally effective to control the formation of soluble mercury within regulatory limits.

An end cap or lamp base 2 for a tubular mercury arc lamp is illustrated in the drawings. The lamp base 2 is a dish-shaped piece 4 which is provided with a pair of electrical connector pins 6 having a hollow bore to receive electrical leads from the lamp tube, not shown. An insulator strip 10 and insulator buttons 11 isolate piece 4 from the current supplied to the lamp. Mercury antioxidant composition 8 is deposited in a circular pattern around the outer area of the end cap near the wall.

Figure 3:
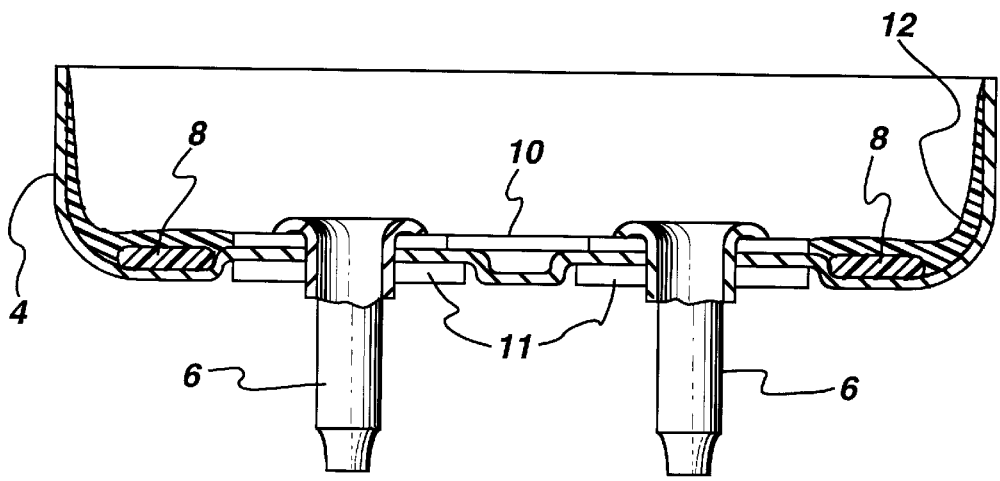
FIG. 3 is a sectional view of a lamp base having the antioxidant composition and basing cement in place.
Figure 4:
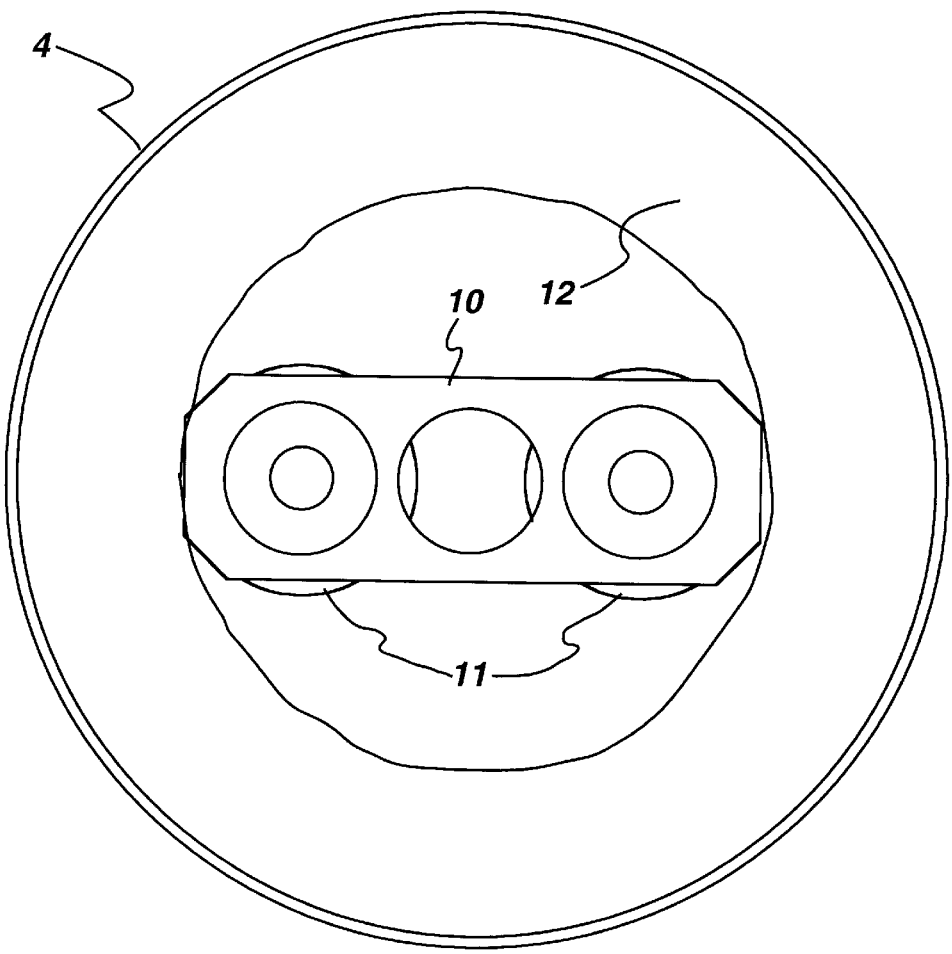
FIG. 4 is a plan view of the lamp base of FIG. 3.

In FIGS. 3 and 4 basing cement 12 is shown in place covering the mercury antioxidant composition and extending at least partially up the inner surface of the lamp base 2.

What is claimed is:

1. An adhesive mercury antioxidant composition for incorporation in a fluorescent lamp comprising an adhesive binder, a liquid processing aid, and an effective amount of a mercury antioxidant compound.

2. An adhesive mercury antioxidant composition according to claim 1, comprising about 5 to about 15 weight percent shellac, about 3 to about 15 weight percent resin, about 5 to about 20 weight percent solvent and an effective amount of a mercury antioxidant compound.

3. A composition according to claim 2 in which the mercury antioxidant compound is ascorbic acid, sodium ascorbate, or sodium gluconate.

4. An adhesive basing cement composition according to claim 1, comprising about 5 to about 15 weight percent shellac, about 3 to about 15 weight percent resin, about 5 to about 20 weight percent solvent and an effective amount of a mercury antioxidant compound.

5. A basing cement composition according to claim 4, in which the mercury antioxidant compound is ascorbic acid, sodium ascorbate, or sodium gluconate.

6. An adhesive mercury antioxidant composition according to claim 1, comprising about 50 to about 90 weight percent ascorbic acid, about 5 to about 15 weight percent shellac, about 3 to about 15 weight percent resin, and about 5 to about 20 weight percent denatured alcohol.

7. A basing cement composition according to claim 1, comprising about 50 to about 90 weight percent ascorbic acid, about 5 to about 15 weight percent shellac, about 3 to about 15 weight percent resin, and about 5 to about 20 weight percent denatured alcohol.

8. A composition according to claim 1 for incorporation of the mercury antioxidant into a fluorescent lamp which comprises about 5 to 15 weight percent shellac, 3 to 15 weight percent rosin, and 5 to 20 weight percent denatured alcohol or up to about 10 weight percent tertiary amyl alcohol, the balance being filler and an effective amount of a mercury antioxidant compound.

9. A composition according to claim 1 for incorporation of the mercury antioxidant into a fluorescent lamp which comprises about 5 to 15 weight percent shellac, 3 to 15 weight percent rosin, and 5 to 20 weight percent denatured alcohol or up to about 10 weight percent tertiary amyl alcohol, the balance being filler and from about 0.2 to about 3 grams of a mercury antioxidant compound.

10. A compositions according to claim 1 which comprises about 50 to 90 weight percent ascorbic acid, 5 to 15 weight percent shellac, 3 to 15 weight percent rosin, and 5 to 20 weight percent denatured alcohol.

* * * * *

UNITED STATES PATENT AND TRADEMARK OFFICE
CERTIFICATE OF CORRECTION

PATENT NO. : 5,821,682
DATED : October 13, 1998
INVENTOR(S) : Donald Franklin Foust et al.

It is certified that error appears in the above-identified patent and that said Letters Patent is hereby corrected as shown below:

On the title page, Item [75],

"Inventors:" please correct spelling of the inventor as follows: cancel "Dennis James Doliac" and substitute --Dennis James Doljac--.

Signed and Sealed this

Twentieth Day of July, 1999

Attest:

Q. TODD DICKINSON

Attesting Officer

Acting Commissioner of Patents and Trademarks